Patented Feb. 18, 1947

2,415,884

UNITED STATES PATENT OFFICE 2,415,884

HYDROXY-CARBOXY NAPHTHALENES

August H. Homeyer, St. Louis, Mo., assignor to Mallinckrodt Chemical Works, St. Louis, Mo., a corporation of Missouri No Drawing. Original application July 14, 1941, Serial No. 402,427. Divided and this application November 8, 1943, Serial No. 509,489

3 Claims. (Cl. 260—520)

This invention relates to substituted naphthalenes, and more particularly to hydroxy-carboxy naphthalenes.

This application is a division of my co-pending application Serial No. 402,427, filed July 14, 1941.

Among the objects of this invention is the provision of new methods for preparing chemical compounds; the provision of new chemical compounds of the type indicated; and the provision of methods for preparing new chemical compounds of the type referred to. Other objects will be in part obvious and in part pointed out hereinafter.

The invention accordingly comprises the elements and combination of elements, the proportions thereof, steps and sequence of steps, and features of composition and synthesis, analysis, or metathesis, which will be exemplified in the substances, products and processes hereinafter described, and the scope of the application of which will be indicated in the following claims.

According to the present invention new derivatives of naphthalene, having hydroxyl groups either free or etherified in the 1 and 4 positions, and a carboxyl group or groups free or esterified in the 2 and/or 3 positions, are provided, together with new methods for preparing compounds of this type.

EXAMPLE 1

*1,4-dihydroxy-2,3-dicarbethoxynaphthalene*

Sodium metal (25 g.) was dissolved in anhydrous alcohol (500 ml.) in a 2-liter, 3-necked flask, fitted with a stirrer, condenser, and dropping funnel, and heated on an oil bath. Alcohol (310 ml.) was distilled off, at which time the sodium ethylate which was formed was beginning to cake. Diethyl phthalate (400 ml.) was added and the mixture was stirred and heated while diethyl succinate (88 g.) was added dropwise during one and one-half hours.

The reaction mixture became dark red during the addition of the diethyl succinate and about 200 ml. of alcohol were obtained as distillate. The reaction mixture was heated three quarters of an hour longer at 115° C. inside temperature. After cooling, water (500 ml.) was added to the flask and dissolved the solid. The mixture was transferred to a separator, benzene (300 ml.) was added, and the aqueous phase was separated. The organic layer was reextracted with dilute sodium hydroxide solution containing a small amount of sodium hyposulfite. The combined aqueous extracts were acidified to Congo with hydrochloric acid. A dark red oil separated and was isolated by decanting the aqueous layer which was then extracted with ether. The ether extract was evaporated and the oil obtained was added to the main portion. This soon solidified to a red mass and was recrystallized from alcohol containing a little concentrated hydrochloric acid. Colorless crystals of 1,4-dihydroxy-2,3-dicarbethoxy-naphthalene in a yield of 48% of the theoretical were obtained. The crystals melted at 62–63° C.

EXAMPLE 2

*1,4-dihydroxynaphthoic acid-2*

1,4-dihydroxy-2,3-dicarbethoxynaphthalene (24 g.) was dissolved in a solution of sodium hydroxide (24 g.) in water (100 ml.) containing about ½ g. of sodium hyposulfite, and kept over night. The orange-colored solution was poured onto a mixture of ice and concentrated hydrochloric acid (about 50 ml.). Carbon dioxide was evolved and a yellow solid separated. It was filtered off and recrystallized from glacial acetic acid. The product was warmed with water to remove the acetic acid of crystallization, filtered, washed and dried. The yield of 1,4-dihydroxynaphthoic acid-2 was 87% of the theoretical. It decomposed at about 201° C. and recrystallized from dilute alcohol as long needles. Neutral equivalent: Calculated, 204; found, 199.

EXAMPLE 3

*1,4-dimethoxy-2,3-dicarbethoxynaphthalene*

Sodium metal (5.5 g.) was dissolved in anhydrous alcohol (175 ml.). 1,4-dihydroxy-2,3-dicarbethoxynaphthalene (27 g.) was added and methyl iodide (40 g.) was likewise added. The mixture was kept over night, then refluxed for five hours and poured onto ice and a little hydrochloric acid. An oil separated which was removed and mixed with alcohol (10 ml.) and cooled in dry ice. After it had solidified petroleum ether was added and the solid was filtered off. Upon recrystallization 1,4-dimethoxy-2,3-dicarbethoxynaphthalene, having a melting point of 48–49° C., was obtained.

EXAMPLE 4

*1-methoxy-4-hydroxy-2,3-dicarbethoxynaphthalene*

Sodium metal (1.4 g.) was dissolved in anhydrous alcohol (150 ml.) and 1,4-dihydroxy-2,3-dicarbethoxynaphthalene (18 g.) was added. Methyl iodide (7 ml.) was introduced and the mixture, after being kept over night, was refluxed for four hours. It was neutral to phenolphthalein. When poured into a mixture of ice and a little hydrochloric acid, a waxy yellow solid separated. Recrystallization from alcohol yielded 1-methoxy-4-hydroxy-2,3-dicarbethoxynaphthalene melting at 80–81° C.

EXAMPLE 5

*1,4-dimethoxy-2,3-dicarbethoxynaphthalene*

1-methoxy-4-hydroxy- 2,3 -dicarbethoxynaphthalene (6.3 g.) was methylated with sodium ethylate (0.6 g. sodium) and methyl iodide (3 ml.) in anhydrous alcohol (50 ml.). 1,4-dimethoxy-2,3-dicarbethoxynaphthalene was obtained.

EXAMPLE 6

*1,4-dimethoxynaphthalene-2,3-dicarboxylic acid*

1,4 - dimethoxy- 2,3 -dicarbethoxynaphthalene (6.5 g.) was added to a solution of sodium hydroxide (4.5 g.) in water (10 ml.) and alcohol (40 ml.). After warming on the steam bath for about an hour the mixture was poured onto ice and hydrochloric acid (25 ml.). The precipitated solid was filtered off and recrystallized from dilute alcohol. When heated in a capillary tube the melting point of the anhydride of the 1,4-dimethoxynaphthalene-2,3-dicarboxylic acid was 202–204° C. Neutral equivalent of the acid: Calculated, 138; found 137.5.

EXAMPLE 7

*1-hydroxy-4-methoxynaphthoic acid-3*

1-methoxy-4-hydroxy- 2,3 -dicarbethoxynaphthalene (6.5 g.) was dissolved in a solution of sodium hydroxide (5 g.) in water (75 ml.), refluxed for two hours and kept over night at 70° C. It was poured onto ice and hydrochloric acid. Carbon dioxide was evolved and a pink solid separated. The 1 - hydroxy - 4 - methoxynaphthoic acid-3, recrystallized from dilute alcohol, had a melting point of 217–219° C.

EXAMPLE 8

*1-hydroxy-4-methoxynaphthoic acid-2*

1,4-dihydroxynaphthoic acid-2 (20 g.) was dissolved in methyl alcohol (280 g.) and saturated with hydrogen chloride. On heating for three hours, considerable solid material separated. It has then cooled, again saturated with hydrogen chloride and was kept over night. The next day the reaction product was poured into water (500 ml.) and the precipitate was filtered off and dried. The product was mixed with dilute sodium bicarbonate solution in which it partly dissolved. The insoluble portion was extracted with ether. The aqueous solution was acidified, yielding a white solid. Upon recrystallization from acetic acid and from dilute alcohol, 1-hydroxy-4-methoxynaphthoic acid-2 was obtained. It decomposed at 196–198° C. with sintering, at somewhat lower temperatures.

EXAMPLE 9

*Methyl-1-hydroxy-4-methoxynaphthoate-2*

The ether extract of the sodium bicarbonate solution obtained in the preceding example was evaporated to dryness, yielding a gray solid which melted at about 137° C. Methyl-1-hydroxy-4-methoxynaphthoate-2, upon recrystallization from a mixture of methyl alcohol and acetic acid and then from acetone, was obtained, melting at 137–138° C.

EXAMPLE 10

*Methyl-1-hydroxy-4-methoxynaphthoate-2*

Diazomethane was prepared from ethyl-nitroso-methyl-urethane (2.64 g.) and a solution (10 ml.) containing 25% by weight of potassium hydroxide in methyl alcohol. The caustic solution was placed in a small flask, warmed on a steam bath, while the urethane dissolved in ether was added from a dropping funnel, the distillate being absorbed in ether, cooled in an ice bath. 1-hydroxy-4-methoxynaphthoic acid-2 (1.09 g.) was added, dissolved in a mixture of ether (25 ml.) and methyl alcohol (10 ml.). After keeping over night, the ether solution was shaken with dilute hydrochloric acid, dried over calcium chloride and evaporated. The methyl-1-hydroxy-4-methoxynaphthoate-2 obtained melted at 136–138° C.

EXAMPLE 11

*Methyl-1,4-dimethoxynaphthoate-3*

Diazomethane was prepared from an ether solution of ethyl-nitroso-methyl-urethane (2.64 g.) and 10 ml. of 25% by weight potassium hydroxide in methyl alcohol. The ethereal distillate of diazomethane was received in anhydrous ether (50 ml.), cooled in ice, and 1-hydroxy-4-methoxynaphthoic acid-3 (1.1 g.) was added dissolved in ether (25 ml.) and methyl alcohol (15 ml.). After standing over night the ether solution was shaken with dilute hydrochloric acid, washed with dilute sodium hydroxide, dried and evaporated to dryness. The methyl-1,4-dimethoxynaphthoate-3 crystallized from dilute methyl alcohol as plates. It sublimed in a high vacuum at 90° C. and melted at 57–59° C.

EXAMPLE 12

*Methyl-1,4-dimethoxynaphthoate-3*

Methyl-1-hydroxy-4-methoxynaphthoate-2 was methylated with diazomethane in methanol solution. The diazomethane was in excess. Methyl-1,4-dimethoxynaphthoate-3 was obtained.

EXAMPLE 13

*Methyl-1,4-dimethoxynaphthoate-3*

Methyl-1-hydroxy-4-methoxynaphthoic acid-2 was methylated with sodium methylate and methyl iodide. As in Example 12, methyl-1,4-dimethoxynaphthoate-3 was obtained. It melted, after recrystallization and sublimation, at 54–57° C. It crystallized into colorless plates from dilute methyl alcohol.

From the foregoing it will be clear that the present invention provides an improved method for preparing the 1,4-dimethoxy and 1-hydroxy-4-methoxy derivatives, and also the corresponding acids. Decarboxylated derivatives which have the remaining carboxyl group at the 3-position are likewise disclosed.

Attention is directed to my copending application, Serial No. 521,848, filed February 10, 1944.

In view of the above, it will be seen that the several objects of the invention are achieved and other advantageous results attained.

As many changes could be made in the above processes and substances and products without departing from the scope of the invention, it is intended that all matter contained in the above description shall be interpreted as illustrative and not in a limiting sense.

What is claimed is:

1. The method of forming 1,4-dihydroxynaphthoic acid-2, which comprises hydrolyzing 1,4-dihydroxy-2,3-dicarbethoxynaphthalene with sodium hydroxide and decarboxylating the product with hydrochloric acid.

2. The method of forming 1,4-dihydroxynaphthoic acid-2, which comprises dissolving 1,4-dihydroxy-2,3-dicarbethoxynaphthalene in a solution of sodium hydroxide and then mixing the solution with concentrated hydrochloric acid.

3. The method of forming 1,4-dihydroxynaphthoic acid-2, which comprises hydrolyzing 1,4-dihydroxy-2,3-dicarbethoxynaphthalene with a caustic alkali and decarboxylating with an acid which is stronger than the naphthoic acid produced.

AUGUST H. HOMEYER.

REFERENCES CITED

The following references are of record in the file of this patent:

UNITED STATES PATENTS

| Number | Name | Date |
| --- | --- | --- |
| 1,551,373 | Daudt | Aug. 25, 1925 |
| 2,154,626 | Koch | Apr. 18, 1939 |
| 1,966,067 | Jaeger | July 10, 1934 |
| 1,956,718 | Jaeger | May 1, 1934 |

OTHER REFERENCES

Schwerin, Berichte der Deutschen Chem. Ges., vol. 27, p. 112.

Nikuni et al., Chem. Abstracts, vol. 34, col. 3259.

Cason et al., Jour. Am. Chem. Soc., vol. 63, pp. 1256–8.

Beilstein (4th ed.), vol. X, pp. 442–443, 564 copies in Scientific Lib.

Karrer, "Organic Chemistry," (1938), pages 188–189. (Copy in Division 6.)